United States Patent
Lee et al.

(10) Patent No.: US 9,969,130 B1
(45) Date of Patent: May 15, 2018

(54) NOZZLE CLEANING MODULE

(71) Applicants: XYZPRINTING, INC., New Taipei (TW); KINPO ELECTRONICS, INC., New Taipei (TW)

(72) Inventors: Yang-Teh Lee, New Taipei (TW); Jia-Yi Juang, New Taipei (TW); Yi-Chu Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days. days.

(21) Appl. No.: 15/628,646

(22) Filed: Jun. 21, 2017

(30) Foreign Application Priority Data

Apr. 21, 2017 (TW) .............................. 106113535 A

(51) Int. Cl.
  *B29C 67/00* (2017.01)
  *B33Y 30/00* (2015.01)
  *B41J 2/165* (2006.01)

(52) U.S. Cl.
  CPC .......... *B29C 67/0096* (2013.01); *B33Y 30/00* (2014.12); *B41J 2/16547* (2013.01)

(58) Field of Classification Search
  CPC .................. B41J 2/16547; B41J 2/16353; B41J 2/16538; B41J 2/16544; B41J 2/14
  See application file for complete search history.

(56) References Cited

U.S. PATENT DOCUMENTS 6,575,553 B1 * 6/2003 Williams ............. B41J 2/16547
  347/22
9,889,665 B2 * 2/2018 Ogawa ................. B41J 2/16505

* cited by examiner

*Primary Examiner* — Lamson Nguyen
(74) *Attorney, Agent, or Firm* — Chun-Ming Shih; HDLS IPR Services

(57) ABSTRACT

A nozzle cleaning module including a base housing, a main carrier, a sub-carrier, a driving assembly and an interference structure is provided. The main carrier is received in the base housing, a wiper protrudes upwardly from the main carrier, and the main carrier has a sub-slope. The sub-carrier is received in the main carrier, a cover protrudes upwardly from the sub-carrier, and at least a portion of the sub-carrier is in contact with the sub-slope. The driving assembly is connected to the main carrier and obliquely lifts the main carrier in relation to the base housing to lift the wiper. The sub-carrier moves along with the main carrier at the same time. The interference structure is arranged corresponding to the sub-carrier to move the sub-carrier along the sub-slope, so the cover can be raised.

13 Claims, 8 Drawing Sheets

NOZZLE CLEANING MODULE

BACKGROUND OF THE INVENTION

Field of the Invention

The present invention relates to a nozzle cleaning module for a heat-melting type three-dimensional printer and, in particular, to a hidden type nozzle cleaning module.

Description of Related Art

Usually, a three-dimensional (3D) printer with a coloring function has a formation nozzle for extruding a melted material and also has a coloring nozzle for coloring. Therefore, the 3D printer is provided with a cleaning module for cleaning the coloring nozzle and a cover set module which is used to cover the coloring nozzle to prevent ink from drying out when the 3D printer is not in use. Normally, the cleaning module includes a wiper protruding out of a formation plane, and the coloring nozzle moves to the wiper to rub against the wiper for cleaning. The cover set module can ascend or descend, and at least a portion of the cover set module protrudes out of the formation plane, so that the coloring nozzle can push to raise a cover of the cover set module.

At least the above-mentioned components are protrudingly disposed on the formation plane. During a printing process, the formation nozzle or the coloring nozzle may interfere with the above-mentioned protruding components. When the formation nozzle moves to an edge of the formation plane, the coloring nozzle may exceed an area of the formation plane to interfere with the above-mentioned protruding components. As a result, the formation nozzle in particular movement courses should not move to the edge of the formation plane, so a portion the area of the formation plane cannot be used for printing a product, thus further limiting a size of the finished product.

The wiper and the cover are not associated. Therefore, to receive the wiper and the cover plate below the formation plane, two sets of a motor and gears are required for driving the wiper and the cover plate, respectively, which leads to a larger overall size and higher production costs.

In views of this, in order to solve the above disadvantage, the present inventor studied related technology and provided a reasonable and effective solution in the present disclosure.

SUMMARY OF THE INVENTION

The present invention provides a hidden-type nozzle cleaning module.

The present invention provides a nozzle cleaning module which comprises a base housing, a main carrier, a sub-carrier, a driving assembly, and an interference structure. The main carrier is accommodated in the base housing and is disposed with a wiper protruding upwardly on the main carrier. The main carrier includes a sub-slope. The sub-carrier is accommodated in the main carrier, a cover protruding upwardly is arranged on the sub-carrier, and at least a portion of the sub-carrier is in contact with the sub-slope. The driving assembly is connected to the main carrier and obliquely lifts or lowers the main carrier with respect to the base housing to lift or lower the wiper, and the movement of the main carrier moves the sub-carrier at the same time. The interference structure is arranged corresponding to the sub-carrier, wherein when the interference structure contacts the sub-carrier while the sub-carrier is moving, the interference structure moves the sub-carrier along the sub-slope with respect to the main carrier, and the cover thereby ascends.

In the nozzle cleaning module according to the present invention, the interference structure is disposed inside the base housing.

In the nozzle cleaning module according to the present invention, the driving assembly includes a motor and a gear set, and the gear set is operatively associated with the motor and the main carrier. The main carrier includes a rack, and the rack meshes with the gear set. The base housing includes a main slope parallel to the rack, an upper end of the main slope is arranged corresponding to the interference assembly, at least a portion of the main carrier is in contact with the main slope, and the driving assembly drives the main carrier to ascend or descend along the main slope. The main slope and the sub-slope are inclined in opposite directions.

In the nozzle cleaning module according to the present invention, the base housing includes a main slope, at least a portion of the main carrier is in contact with the main slope, and the driving assembly drives the main carrier to ascend or descend along the main slope. The main slope and the sub-slope are inclined in opposite directions. A main slide pin in contact with the main slope protrudes from the main carrier, and a sub-slide pin in contact with the sub-slope protrudes from the sub-carrier.

In the nozzle cleaning module according to the present invention, the wiper is liftable to protrude out of a top surface of the base housing. The cover is liftable to protrude out of the top surface of the base housing.

In the nozzle cleaning module according to the present invention, the motor drives the main carrier to move obliquely, and the movement direction is changed by means of the sub-slope and the interference structure. Therefore, with a single motor only, the wiper and the cover can ascend or descend.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION OF THE INVENTION

Figure 1:
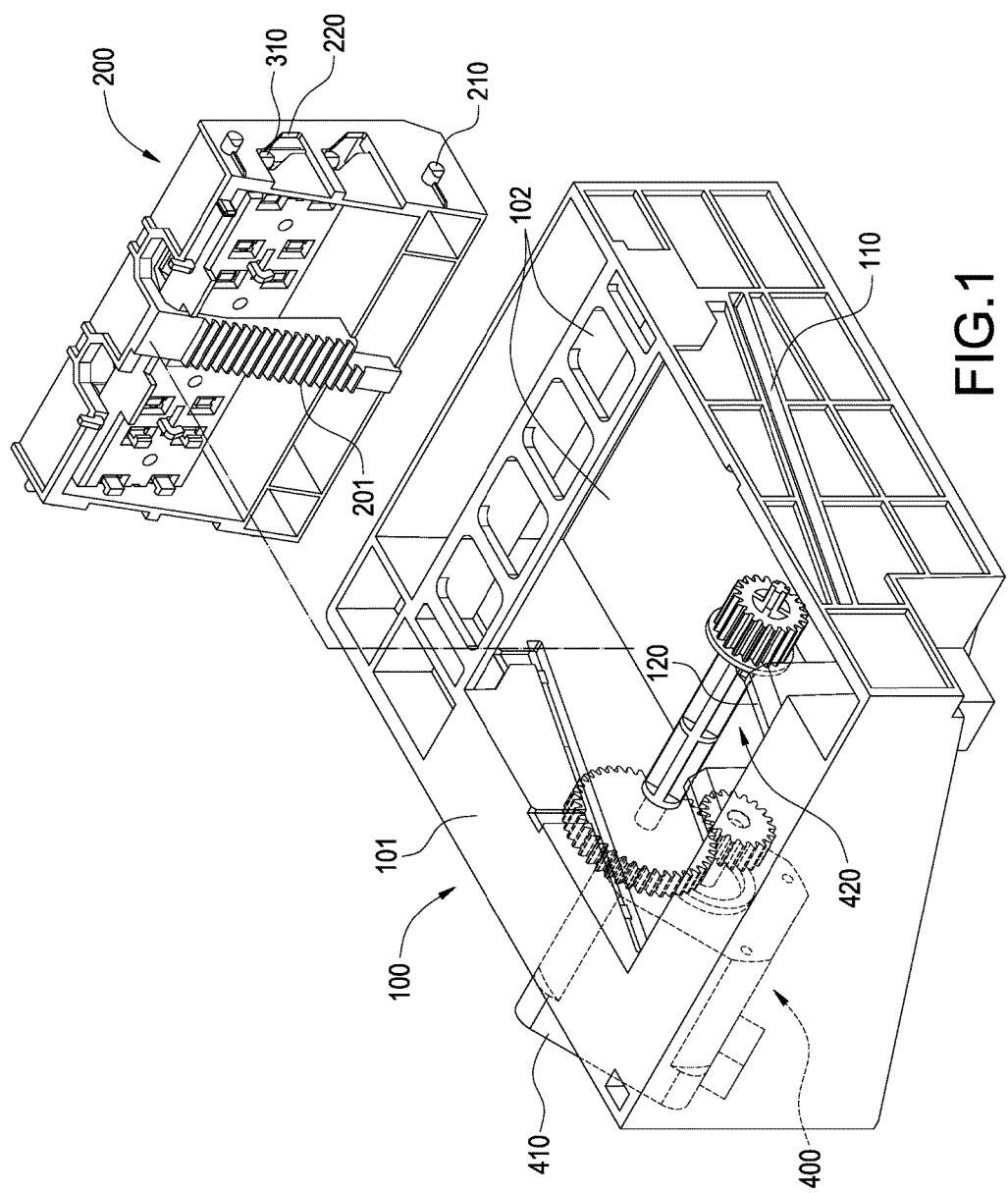
FIGS. 1 and 2 are perspective exploded views illustrating a nozzle cleaning module according to the present invention.
Figure 2:
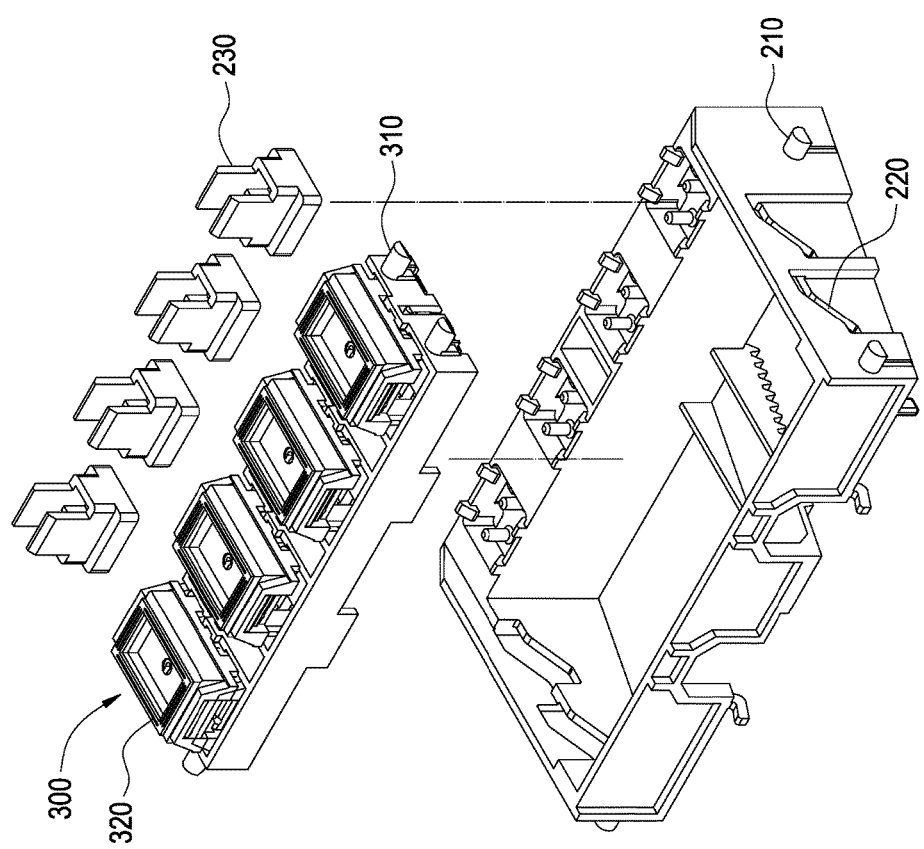

Please refer to FIGS. 1 to 4 showing a nozzle cleaning module according to one embodiment. The nozzle cleaning module is used in a heat-melting type three dimensional (3D) printer (not illustrated) and is disposed corresponding to a formation plane 10 of the 3D printer. The nozzle cleaning module includes a base housing 100, a main carrier 200, a sub-carrier 300, a driving assembly 400, and an interference structure 120.

In the present embodiment, the base housing 100 is a hollow housing, and the present invention is not limited to any particular material of the base housing 100. The base housing 100 is fixed to the 3D printer and is disposed at one side of the formation plane 10. A top surface 101 of the base housing 100 includes at least one opening 102. The top surface 101 of the base housing 100 is not higher than a level of the formation plane 10. The top surface 101 of the base housing 100 is preferably flush with the formation plane 10, but the top surface 101 of the base housing 100 can also be lower than the formation plane 10. At least one main slope 110 is disposed inside the base housing 100. In the present embodiment, the base housing 100 includes two main slopes 110 with the same structure and functions; however, only one main slope 110 is described hereinafter for simplicity of description.

The main carrier 200 is accommodated in the base housing 100, a wiper 230 protruding upwardly is arranged on the main carrier 200, and the main carrier 200 includes at least one sub-slope 220 inside. In the present embodiment, the main carrier 200 includes multiple same sub-slopes 220 inside. The main slopes 110 and the sub-slopes 220 are inclined in opposite directions. A rack 201 is obliquely disposed on an outer bottom side, and the rack 201 is parallel to the main slope 110. At least one main slide pin 210 protrudes from an outer side surface of the main carrier 200. In the present embodiment, there are two main slide pins 210 with the same structure and functions, and the two main slide pins 210 protruding from respective outer side surfaces of the main carrier 200 are arranged corresponding to the respective main slopes 110. The two main slide pins 210 are respectively in contact with the two main slopes 110; however, only one main slide pin 210 is described hereinafter for simplicity of description.

The sub-carrier 300 is accommodated in the main carrier 200, a cover 320 protruding upwardly is arranged on the sub-carrier 300, at least a portion of the sub-carrier 300 is in contact with the sub-slope 220, and at least one sub-slide pin 310 protrudes from an outer side surface of the sub-carrier 300. In the present embodiment, there are multiple sub-slide pins 310 with the same structure and functions, the multiple sub-slide pins 310 protruding from outer side surfaces of the sub-carrier 300 are disposed respectively corresponding to the above-mentioned sub-slopes 220. Each sub-slide pin 310 is in contact with a corresponding one of the sub-slopes 220; however, only one sub-slide pin 310 is described hereinafter for simplicity of description.

The driving assembly 400 is connected to the main carrier 200 and obliquely lifts or lowers the main carrier 200 with respect to the base housing 100 to lift or lower the wiper 230, and the wiper 230 is lifted to protrude out of a top surface 101 of the base housing 100 through the opening 102. In the present embodiment, the driving assembly 400 includes a motor 410 and a gear set 420, the motor 410 is fixed to the base housing 100, and the gear set 420 is operatively associated with the motor 410 and the main carrier 200. In detail, the gear set 420 is connected to the motor 410 and meshes with the rack 201 of the main carrier 200, so the motor 410 can drive the main carrier 200 to ascend or descend along the main slope 110. However, it is viable that, the main carrier 200 ascends and descends only by means of the gear set 420 driving the inclined rack 201, without requiring the use of the main slope 110. The movement of the main carrier 200 moves the sub-carrier 300 accommodated inside the main carrier 200 at the same time.

An interference structure 120 is arranged inside the base housing 100 corresponding to the sub-carrier 300. In the present embodiment, the interference structure 120 is a protruding block inside the base housing 100. A top end of the main slope 110 is arranged corresponding to the interference structure 120. When the interference structure 120 is in contact with the sub-carrier 300 while the sub-carrier 300 is moving, the interference structure 120 blocks the sub-carrier 300 and maintains a horizontal position of the sub-carrier 300. Once the main carrier 200 continues to move toward the interference structure 120, the interference structure 120 pushes the sub-carrier 300 to move along the sub-slope 220 with respect to the main carrier 200, and the cover 320 thereby ascends. The cover 320 ascends to pass through the opening 102 to protrude out of the top surface 101 of the base casing 100.

Figure 3:
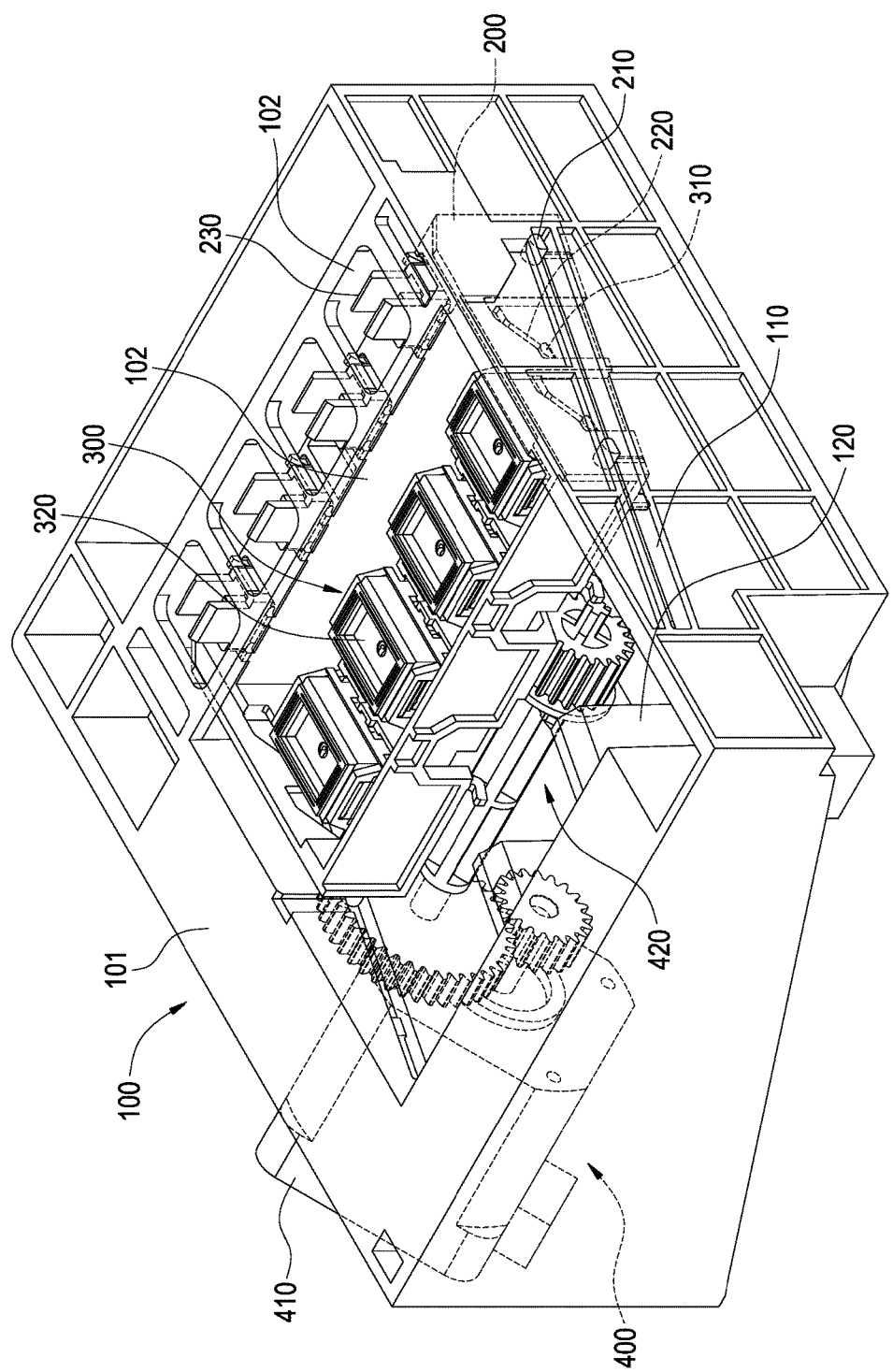
FIG. 3 is a perspective view illustrating the nozzle cleaning module according to the present invention.
Figure 4:
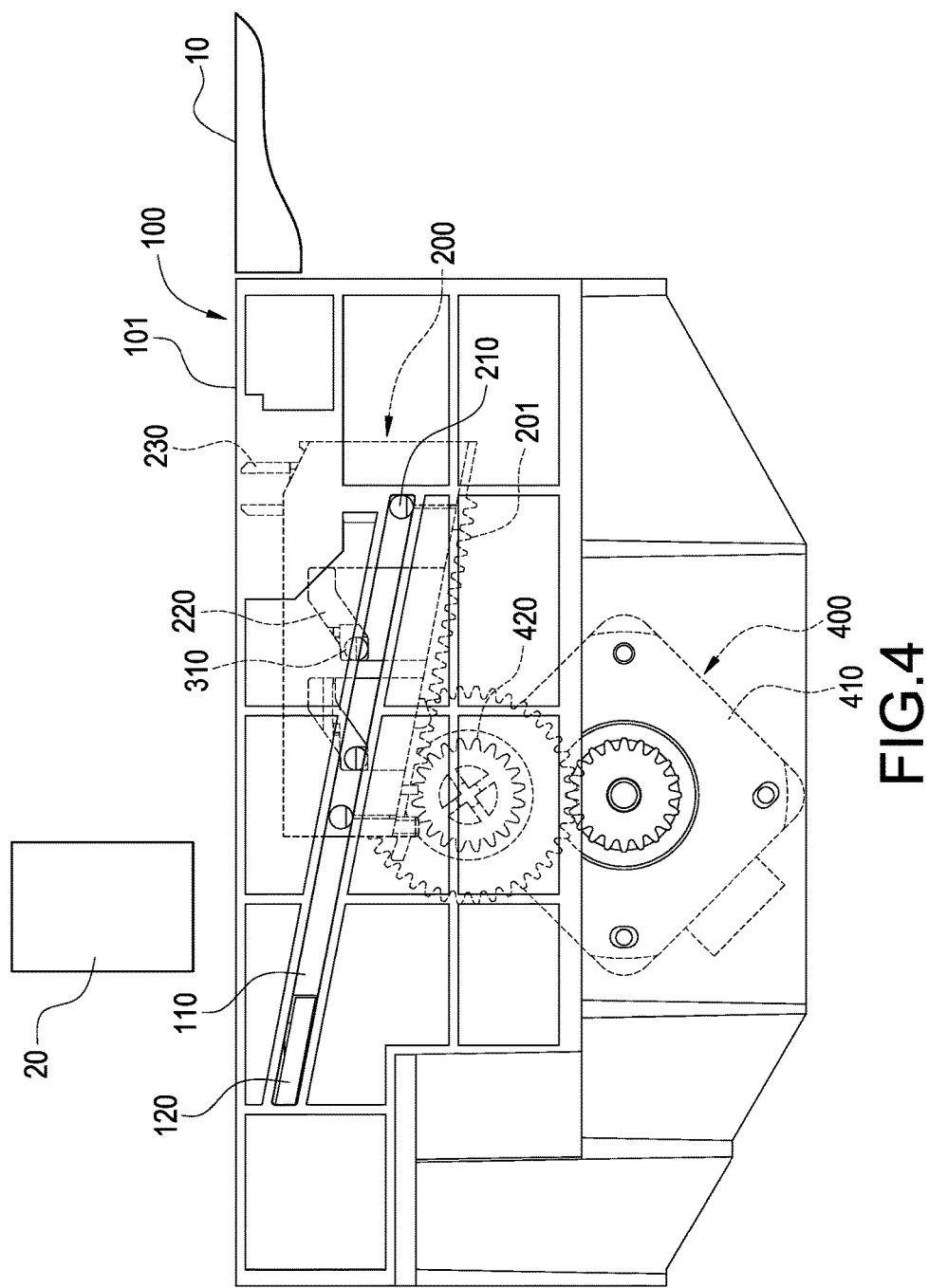
FIGS. 4 to 8 are schematic views illustrating motions of the nozzle cleaning module according to the present invention.
Figure 5:
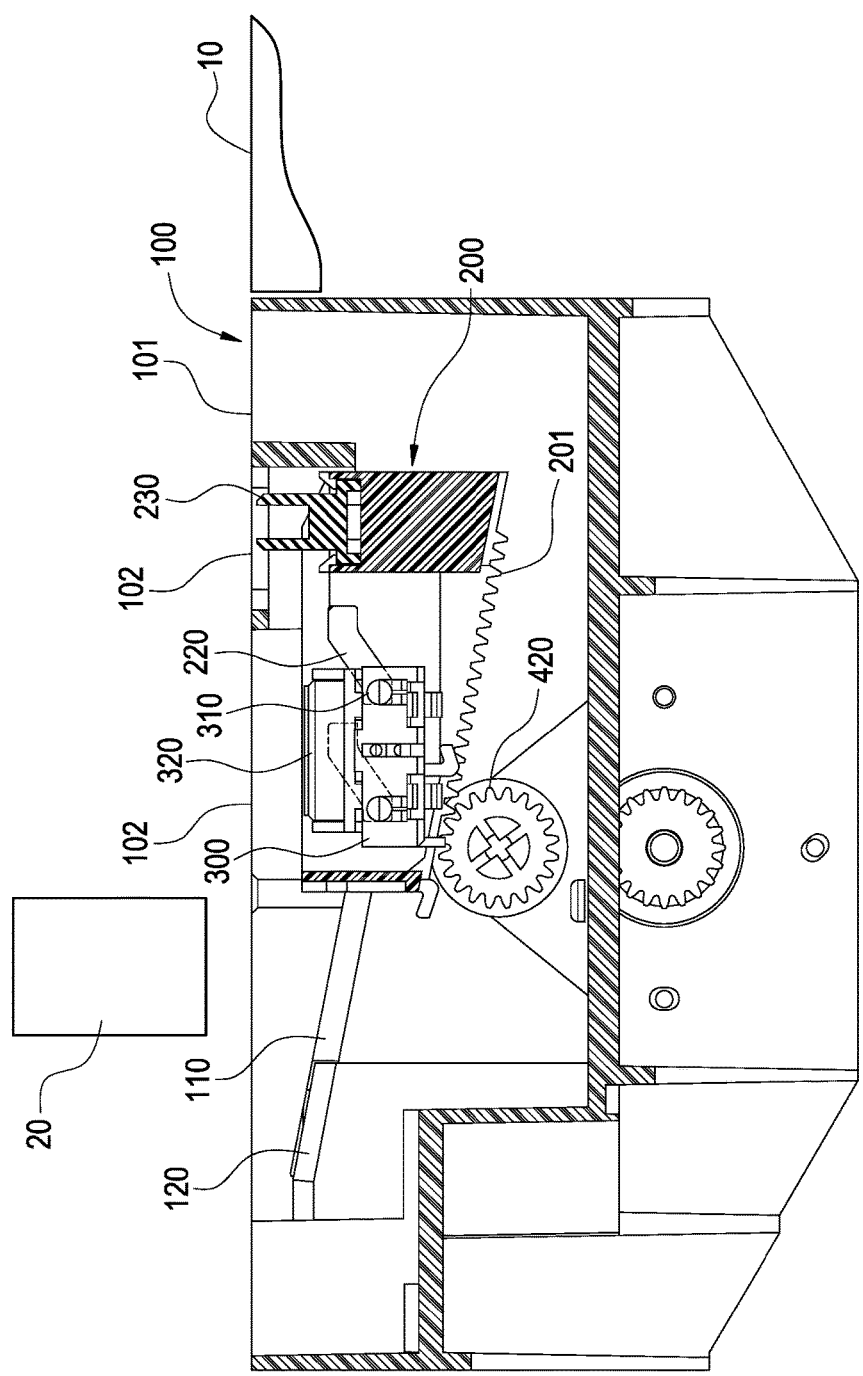

Referring to FIGS. 3 to 5, in the present embodiment, the top surface 101 of the base housing 100 is flush with the formation plane 10. When the 3D printer is in operation, the main carrier 200 is at a lower end of the main slope 110, and the wiper 230 is received in the base housing 100 and is disposed below the top surface 101 of the base housing 100. In addition to that, the sub-carrier 300 is at a lower end of the sub-slope 220, and the cover 320 is received in the main carrier 200 and is disposed below the top surface 101 of the base housing 100. Therefore, during printing operation, a coloring head 20 is allowed to move beyond the formation plane 10, so there is more room available for use on the formation plane 10.

To clean the coloring head 20, the main carrier 200 is driven by the motor 410 to ascend along the main slope 110 toward the interference structure 120, so that the wiper 230 protrudes out of the top surface 101 of the base housing 100. At this point, the sub-carrier 300 does not yet touch the interference structure 120, and the cover 320 is still received inside the main carrier 200 and is disposed below the top surface 101 of the base housing 100. Then, the coloring head 20 is moved to contact the wiper 230, and the coloring head 20 is moved back and forth for cleaning.

Figure 6:
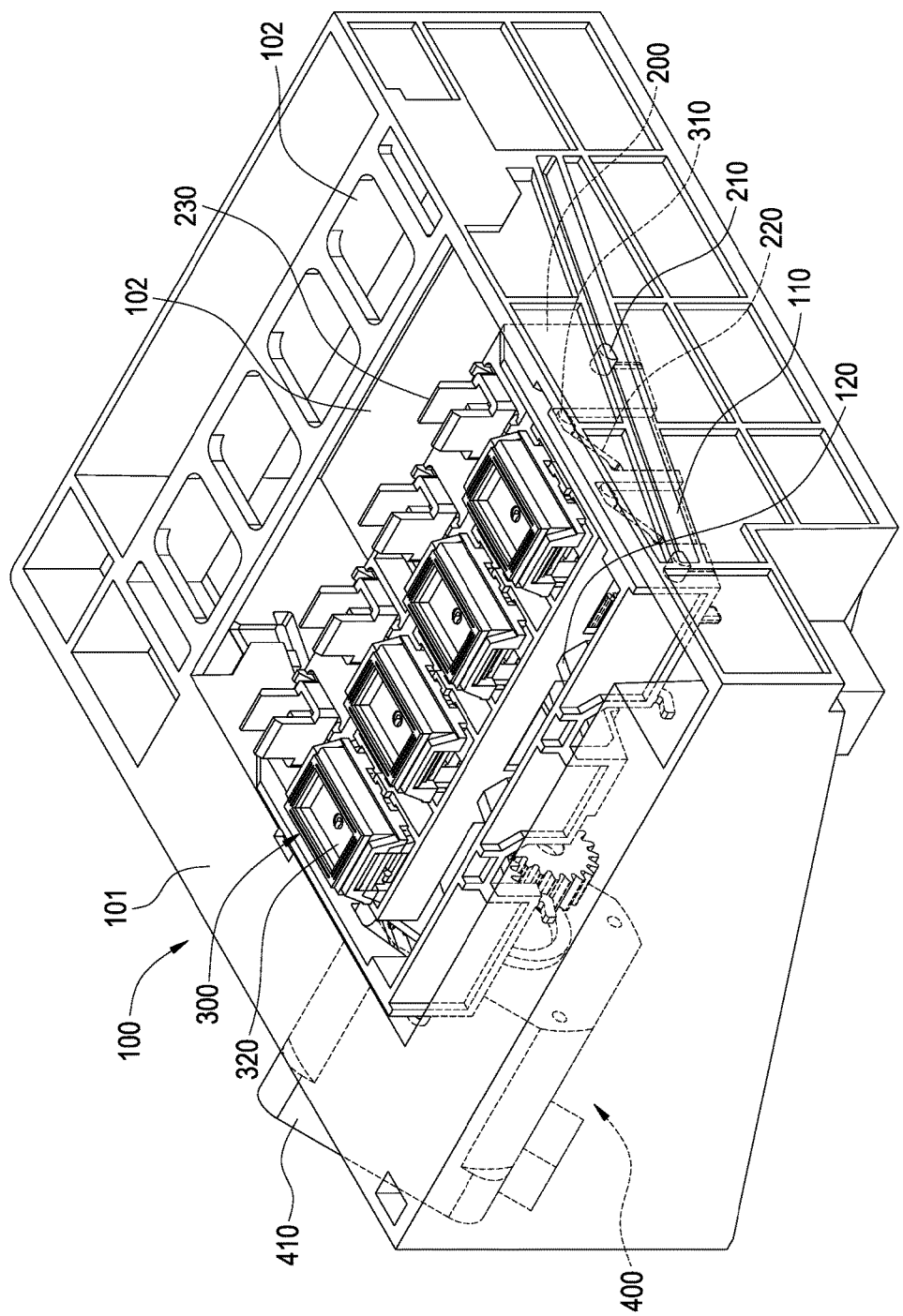
Figure 7:
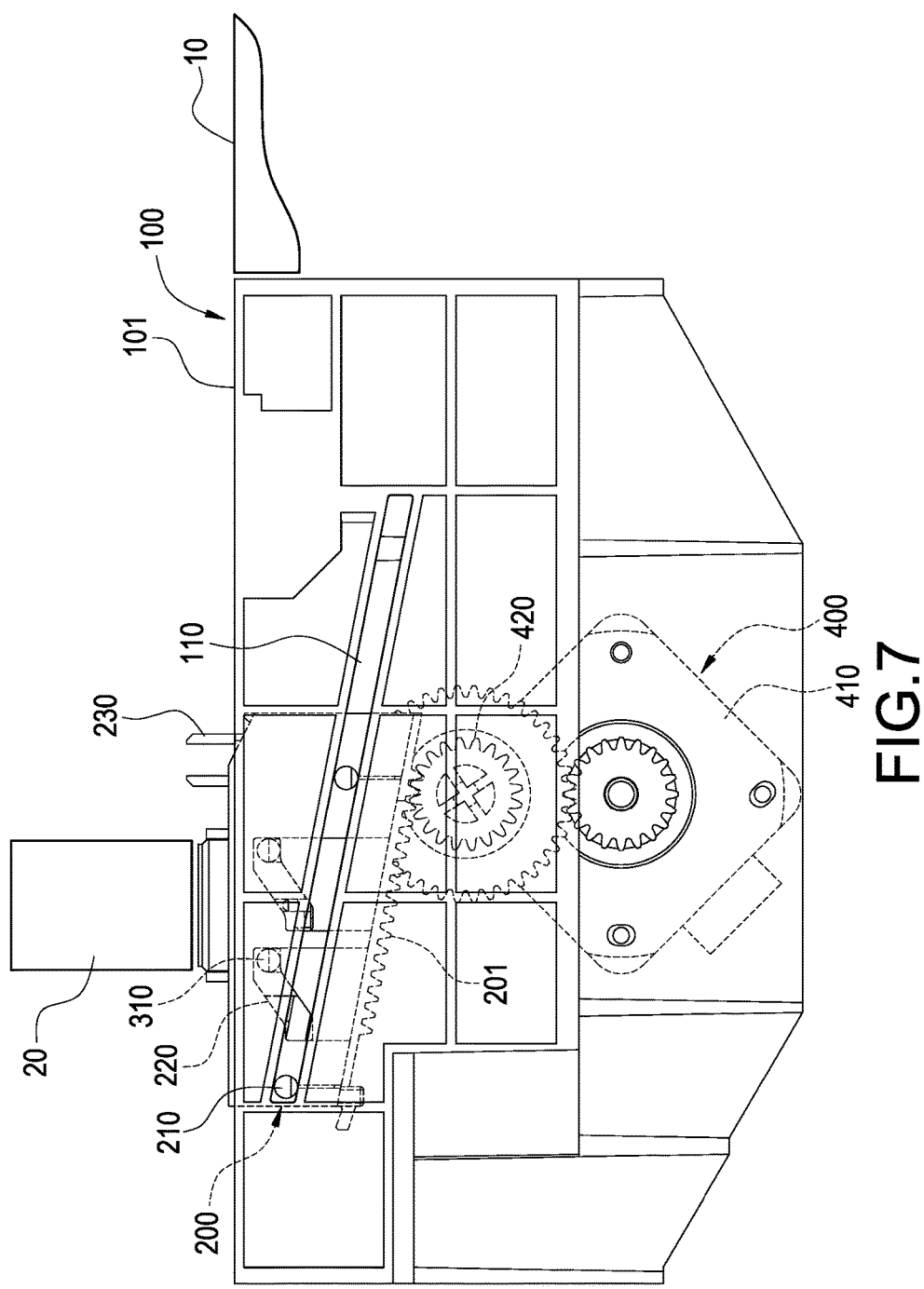
Figure 8:
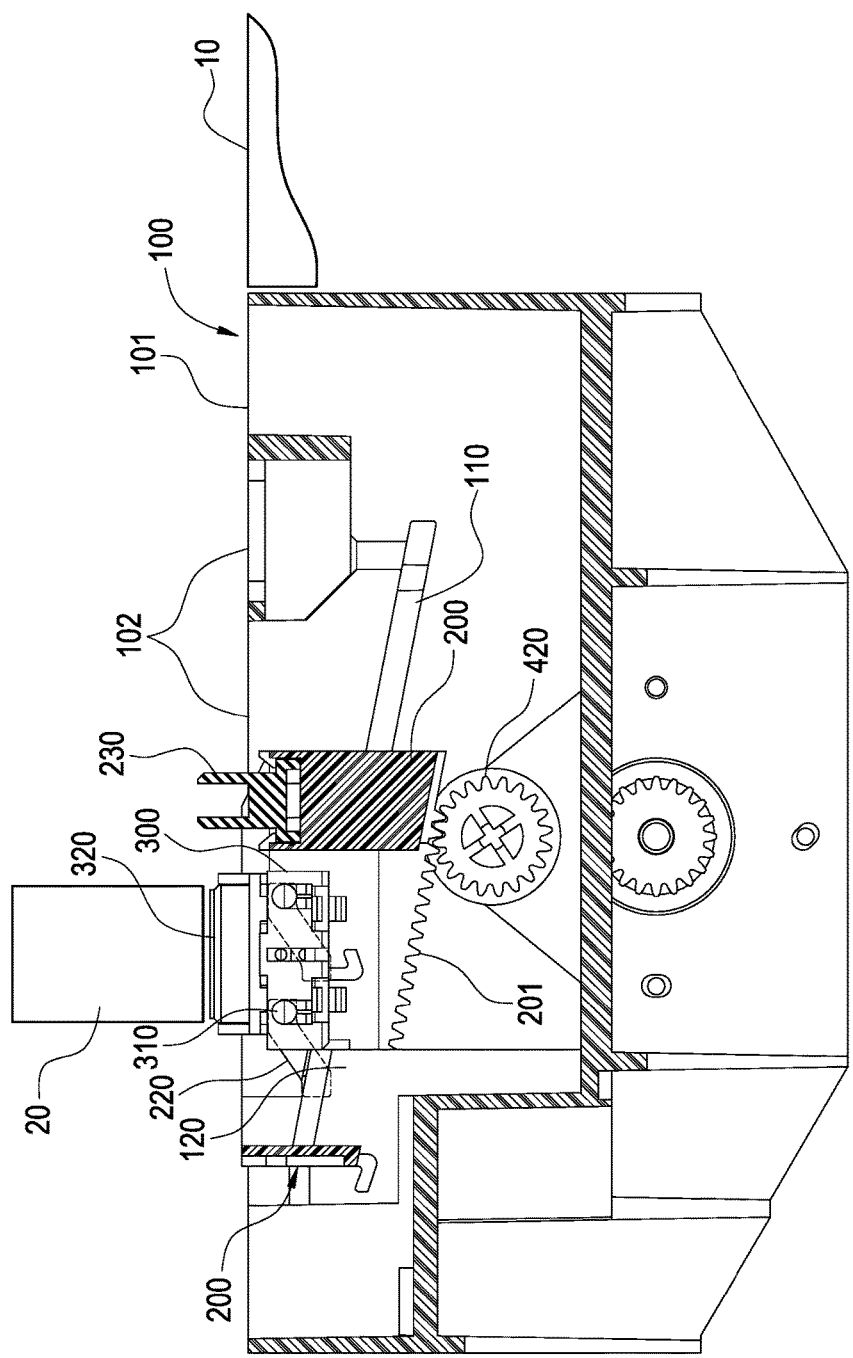

Referring to FIGS. 6 to 8, after cleaning, the coloring head 20 is moved to a standby position, the standby position is arranged corresponding to a position of the interference structure 120. The motor 410 continues to drive the main carrier 200 to move toward the interference structure 120 along the main slope 110. When the sub-carrier 300 touches the interference structure 120, the sub-carrier 300 is blocked from moving horizontally by the interference structure 120, and the cover 320 is at a standby position. The motor 410 continues driving the main carrier 200 to move toward the interference structure 120 along the main slope 110, and the sub-carrier 300 is pushed to an upper end of the sub-slope 220 to vertically raise the cover 320 to cover the coloring head 20.

In the nozzle cleaning module according to the present invention, the main carrier 200 is driven by the motor 410 to move obliquely. The oblique movement achieves horizontal displacement and vertical displacement. Due to the vertical displacement, the wiper 230 ascends or descends vertically. By means of the interference structure 120 and the sub-slope 220, the horizontal displacement of the main carrier 200 is changed to vertical displacement to achieve vertical ascending of the cover 320. Therefore, in the nozzle cleaning module of the present invention, only one motor 410 is required to drive the wiper 230 and the cover 320 to ascend or descend vertically.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A nozzle cleaning module, comprising:
   a base housing;
   a main carrier, the main carrier being accommodated in the base housing, a wiper protruding upwardly being arranged on the main carrier, the main carrier including a sub-slope;
   a sub-carrier, the sub-carrier being accommodated in the main carrier, a cover protruding upwardly being arranged on the sub-carrier, at least a portion of the sub-carrier being in contact with the sub-slope;
   a driving assembly, the driving assembly being connected to the main carrier and obliquely lifting or lowering the main carrier with respect to the base housing to lift or lower the wiper, the movement of the main carrier moves the sub-carrier at the same time; and
   an interference structure arranged corresponding to the sub-carrier, wherein when the interference structure is in contact with the sub-carrier while the sub-carrier is moving, the interference structure pushes the sub-carrier to move along the sub-slope with respect to the main carrier, and the cover thereby ascends.

2. The nozzle cleaning module according to claim 1, wherein the interference structure is disposed inside the base housing.

3. The nozzle cleaning module according to claim 1, wherein the driving assembly includes a motor and a gear set, and the gear set is operatively associated with the motor and the main carrier.

4. The nozzle cleaning module according to claim 3, wherein the main carrier includes a rack, and the rack meshes with the gear set.

5. The nozzle cleaning module according to claim 4, wherein the base housing includes a main slope parallel to the rack, at least a portion of the main carrier is in contact with the main slope, and the driving assembly drives the main carrier to ascend or descend along the main slope.

6. The nozzle cleaning module according to claim 5, wherein the main slope and the sub-slope are inclined in opposite directions.

7. The nozzle cleaning module according to claim 1, wherein the base housing includes a main slope, at least a portion of the main carrier is in contact with the main slope, and the driving assembly drives the main carrier to ascend or descend along the main slope.

8. The nozzle cleaning module according to claim 7, wherein an upper end of the main slope is arranged corresponding to the interference assembly.

9. The nozzle cleaning module according to claim 7, wherein the main slope and the sub-slope are inclined in opposite directions.

10. The nozzle cleaning module according to claim 7, wherein a main slide pin in contact with the main slope protrudes from the main carrier.

11. The nozzle cleaning module according to claim 1, wherein a sub-slide pin in contact with the sub-slope protrudes from the sub-carrier.

12. The nozzle cleaning module according to claim 1, wherein the wiper is liftable to protrude out of a top surface of the base housing.

13. The nozzle cleaning module according to claim 1, wherein the cover is liftable to protrude out of a top surface of the base housing.

* * * * *